United States Patent
Rogers et al.

(10) Patent No.: US 9,608,984 B2
(45) Date of Patent: Mar. 28, 2017

(54) ACCESSIBLE FILES

(75) Inventors: Keith Rogers, Spring, TX (US); Jon P. Styskal, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 908 days.

(21) Appl. No.: 13/384,764

(22) PCT Filed: Oct. 21, 2009

(86) PCT No.: PCT/US2009/061436
§ 371 (c)(1),
(2), (4) Date: Jan. 18, 2012

(87) PCT Pub. No.: WO2011/049561
PCT Pub. Date: Apr. 28, 2011

(65) Prior Publication Data
US 2012/0198543 A1    Aug. 2, 2012

(51) Int. Cl.
*H04L 29/06* (2006.01)
*G06F 21/62* (2013.01)

(52) U.S. Cl.
CPC ...... *H04L 63/0823* (2013.01); *G06F 21/6218* (2013.01)

(58) Field of Classification Search
CPC ............ H04L 63/0823; G06F 21/6218
USPC .......................... 713/156, 176, 180
See application file for complete search history.

(56) References Cited

U.S. PATENT DOCUMENTS

2003/0216172 A1* 11/2003 LeMay et al. ............. 463/29
2008/0045342 A1    2/2008 Crowder et al.

FOREIGN PATENT DOCUMENTS

| CN | 1405689 | 3/2003 |
|---|---|---|
| CN | 101141447 B * | 10/2006 |
| JP | 2008269036 | 11/2008 |
| KR | 1020060056467 | 5/2006 |
| KR | 1020070071855 | 7/2007 |
| KR | 1020080029583 | 4/2008 |
| WO | WO-2009038446 | 3/2009 |

OTHER PUBLICATIONS

Wang Lei, CN 101141447 B (CN101141447A), Google translation of Chinese Patent Publication CN101141447A, Published Mar. 12, 2008.*
ISA/KR, International Search Report dated Jun. 24, 2010, PCT/US2009/061436 filed Oct. 21, 2009.

* cited by examiner

*Primary Examiner* — Beemnet Dada
(74) *Attorney, Agent, or Firm* — HP Patent Department (57) ABSTRACT

A computer implemented method for accessing one or more files including scanning a storage device using a processor for one or more signed files in response to the storage device coupling to a machine, authenticating one or more of the signed files, and configuring the processor to access accessible files from the storage device in response to authenticating one or more of the signed files.

17 Claims, 7 Drawing Sheets

ACCESSIBLE FILES

CROSS-REFERENCE TO RELATED APPLICATION

This application is a national stage application under 35 U.S.C. §371 of PCT/US2009/061436, filed Oct. 21, 2009.

BACKGROUND

When accessing one or more files on a storage device, a user initially couples the storage device to a machine. The user then accesses the storage device on the machine using one or more input devices and proceeds to view one or more files on the storage device. The user can then utilize one or more of the input devices to access one or more of the files on the storage device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
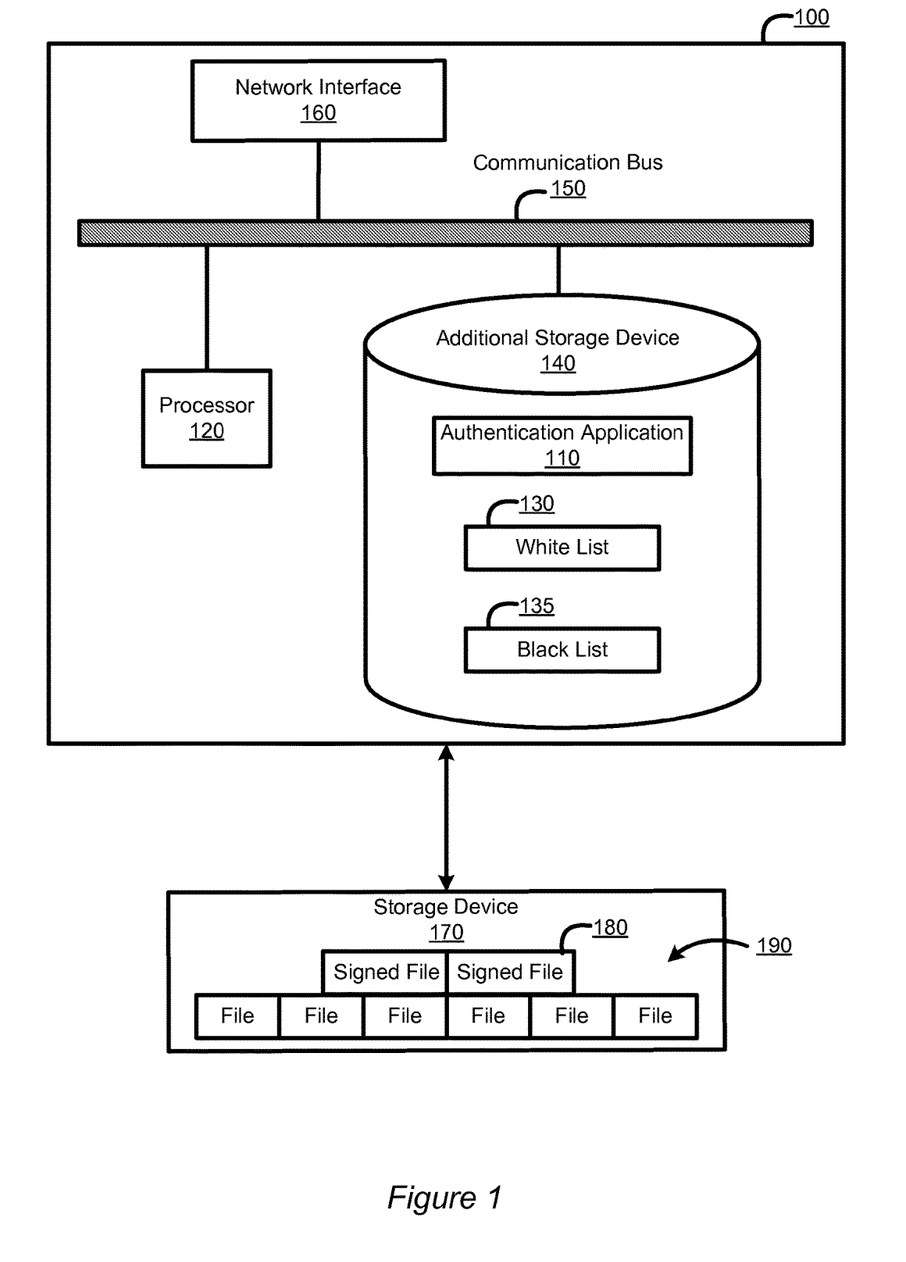
FIG. 1 illustrates a machine coupled to a storage device according to an embodiment of the invention.

FIG. 1 illustrates a machine 100 coupled to a storage device 170 according to an embodiment of the invention. In one embodiment, the machine 100 is a desktop, a laptop, a server, and/or any device that a storage device 170 can be coupled to. As illustrated in FIG. 1, the machine 100 is coupled to the storage device 170 and includes a processor 120, an additional storage device 140, a network interface 160, and a communication bus 150 for the machine 100 and/or one or more components of the machine 100 to communicate with one another.

Further, as illustrated in FIG. 1, the additional storage device 140 stores an authentication application 110, a white list 130, and a black list 135. In other embodiments, the machine 100 includes additional components and/or is coupled to additional components in addition to and/or in lieu of those noted above and illustrated in FIG. 1.

As noted above, the machine 100 includes a processor 120. The processor 120 sends data and/or instructions to the components of the machine 100, such as the additional storage device 140, the network interface 160, and the authentication application 110. Additionally, the processor 120 receives data and/or instruction from components of the machine 100, such as the authentication application 110.

In one embodiment, the processor 120 and/or the authentication application 110 can initially scan one or more ports on the machine 100 for the storage device 170 coupling to the machine 100. In response to detecting the storage device 170 coupling to the machine 100, the authentication application 110 can proceed to scan the storage device 170 with the processor 120 for one or more signed files 180.

The authentication application 110 is an application which can be configured to authenticate one or more signed files 180 on the storage device 170 in response to the storage device 170 coupling to the machine 100. In one embodiment, the authentication application 110 operates as a background service on the machine 100. In another embodiment, the authentication application 110 is launched by the processor 120 in response to the storage device 170 coupling to the machine 100.

When authenticating one or more of the signed foes 180, the authentication application 110 can authenticate a digital certificate of one or more of the signed files 180 with one or more digital signatures and/or in response to a publisher of the digital certificate. After authenticating one or more of the signed files 180, the authentication application 110 can proceed to configure the processor 120 to access accessible files from the storage device 140.

For the purposes of this application, accessible files are signed files 180 which have been successfully authenticated by the authentication application 110 and files 190 from the storage device 170 which are associated with the successfully authenticated signed files 180. Additionally, one or more of the files 190 are associated with a signed file if the corresponding file is listed in the signed file or in a digital certificate of the signed file.

The authentication application 110 can be firmware which is embedded onto the machine 100. In other embodiments, the authentication application 110 is a software application stored on the machine 100 within ROM or on an additional storage device 140 accessible by the machine 100 or the authentication application 110 is stored on a computer readable medium readable and accessible by the machine 100 from a different location.

Additionally, in one embodiment, the additional storage device 140 is included in the machine 100. In other embodiments, the additional storage device 140 is not included in the machine, but is accessible to the machine 100 utilizing a network interface 160 included in the machine 100. The network interface 160 can be a wired or wireless network interface card.

In a further embodiment, the authentication application 110 is stored and/or accessed through a server coupled through a local area network or a wide area network. The authentication application 110 communicates with devices and/or components coupled to the machine 100 physically or wirelessly through a communication bus 150 included in or attached to the machine 100. In one embodiment the communication bus 150 is a memory bus. In other embodiments, the communication bus 150 is a data bus.

As noted above, the authentication application 110 can scan a storage device 170 using the processor 120 for one or more signed files 180 in response to the storage device 170 coupling to the machine 100. In one embodiment, the processor 120 and/or the authentication application 110 initially scan one or more ports on the machine 100 for the storage device 170 coupling to the machine 100.

The storage device 170 is a device which can be configured to store one or more files 190. Additionally, the storage device 170 can be configured to couple to one or more ports on the machine 100 wirelessly or through a wired connection. In one embodiment, the storage device 170 is a hard drive, a thumb drive, a compact disc, a blu-ray disc, or a digital versatile disc. In other embodiments, the storage device 170 is any additional device configured to store one or more files 190 and configured to couple to the machine 100.

Once the storage device 170 is determined to be coupled to the machine 100, the authentication application 110 can proceed to use the processor 120 to scan the contents of the storage device 170 to detect and identify one or more files 190. As illustrated in FIG. 1, the storage device 170 stores one or more files 190. In one embodiment, one or more of the files 190 can be a data, media, text, system, installation, auto run, and/or an executable file. In other embodiments, one or more of the files 190 can include additional file types in addition to and/or in lieu of those noted above.

Additionally, as illustrated in FIG. 1, one or more of the files 190 can be signed. As noted above, one or more of the files 190 can be signed with a digital certificate. Further, one or more of the signed files 180 can list one or more files 190 from the storage device 170 which are associated with the corresponding signed file 180.

A digital certificate is an attachment to a signed file 180 which identifies a publisher and/or distributor of the signed file 180. The digital certificate can be used by the authentication application 110 to validate and/or establish credentials for a corresponding signed file 180 and the files 190 associated with the corresponding signed file 180.

In one embodiment, the digital certificate includes a corresponding digital key. A digital key can include one or more sequence of numbers and/or characters. In another embodiment, the digital certificate can additionally list a corresponding publisher of the digital certificate.

As noted above, if the authentication application 110 detects one or more signed files 180 on the storage device 170, the authentication application 110 will proceed to authenticate one or more of the signed files 180. When authenticating one or more of the signed files 180, the authentication application 110 will authenticate a corresponding digital certificate of the signed file using one or more digital signatures and/or in response to a publisher of the digital certificate.

A digital signature is an encrypted block of data which can be used to decrypt and authenticate a digital key of a digital certificate. The digital signature can include one or more sequence of numbers and/or characters. In one embodiment, one or more digital signatures are stored on a corresponding signed file 180. In another embodiment, one or more of the digital signatures are stored as separate files on the storage device 170 and/or the additional storage device 140. In other embodiments, one or more of the digital signatures are stored on additional locations and/or devices and are accessible to the authentication application 110 through the network interface 160.

When authenticating a digital certificate of a signed file with a digital signature, the authentication application 110 compares a digital key of a corresponding digital certificate to one or more digital signatures and searches for a match. If the authentication application 110 determines that the digital key matches one or more of the digital signatures, the authentication application 110 will determine that the corresponding signed file 180 has been successfully authenticated. Further, the authentication application 110 will determine that the authenticated signed file 180 and the files 190 associated with the successfully authenticated signed file 180 are accessible files.

In another embodiment, if the authentication application 110 determines that the digital key does not match any of the digital signatures, the authentication application 110 will determine that the corresponding signed file 180 has failed authentication. Further, the authentication application 110 can also determine that the unauthenticated signed file 180 and the files 190 associated with the unauthenticated signed file 180 are not accessible files.

Additionally, as noted above, a digital certificate of one or more of the signed files 180 can be authenticated in response to a publisher of a corresponding digital certificate. A publisher of a digital certificate is an entity which has created and/or distributed the digital certificate or a corresponding signed file. As noted above, the digital certificate can list a publisher of the digital certificate.

When authenticating a digital certificate in response to a publisher, the authentication application 110 can access and scan a white list 130 or a black list 135 for the publisher of the digital certificate. As illustrated in FIG. 1, in one embodiment, the white list 130 and/or the black list 135 can be stored on the additional memory storage device 140. In other embodiments, the white list 130 and/or the black list 135 can be stored on additional devices and accessible to the authentication application 110 through the network interface 160.

The while list 130 includes a list of publishers and/or digital certificates of one or more signed files 180 which have been determined by the authentication application 110 to be authentic. In one embodiment, the white list 130 is a certificate store. Additionally, the black list 135 includes a list of publishers and/or digital certificates of one or more signed files 180 which have been determined by the authentication application 110 to be unauthentic.

The authentication application 110 can scan a digital certificate of a signed file 180 to identify a publisher of the digital certificate. The authentication application 110 can then scan the white list 130 and/or the black list 135 for the publisher. If the publisher is found to be listed in the black list 135, the authentication application 110 will determine that the corresponding signed file 180 has failed authentication. Additionally, the authentication application can determine that the corresponding signed file 180 and one or more files 190 associated with the corresponding signed file 180 are not accessible files.

If the publisher is found to be listed in the white list 130, the authentication application 110 will determine the digital certificate is authentic and the corresponding signed file 180 has been successfully authenticated. Additionally, the authentication application 110 can determine that the corresponding signed file 180 and one or more files 190 associated with the corresponding signed file are accessible files.

In one embodiment, if the publisher is not found in the white list 130 and the black list 135, the authentication application 110 can proceed to authenticate the digital certificate with a digital signature. The authentication application 110 can additionally add the publisher and/or the digital certificate of the corresponding signed file 180 to the white list 130 or the black list 135 in response to determining whether the digital key matches a digital signature.

In one embodiment, the authentication application 110 can additionally configure a digital display device to render a message prompting a user to approve or disapprove the adding of the digital certificate or publisher of the corresponding digital certificate to the white list or the black list.

As noted above, once the authentication application 110 has authenticated one or more of the signed files 180, the authentication application 110 can proceed to configure the processor 120 to access the accessible files from the storage device 170. In configuring the processor 120, the authentication application 110 sends one or more instructions for the processor 120 to access the accessible files from the storage device 170. Additionally, as noted above, the accessible files are signed files 180 which have been authenticated and files 190 from the storage device 170 which are associated with the successfully authenticated signed files 180.

In one embodiment, if the authentication application 110 determines that an authenticated signed file 180 or one of the files 190 associated with the authenticated signed file 180 is an auto run file, then the authentication application 110 will determine that all of the files 190 from the storage device 170 are accessible files.

In another embodiment, if the authentication application 110 determines that none of the successfully authenticated signed files 180 and the associated files 190 are an auto run file, the authentication application 110 will additionally determine whether one of the successfully authenticated signed files 180 or one or more of the associated files 190 are an executable file.

If one of the successfully authenticated signed files 180 or one or more of the associated files 190 are determined to be an executable file, the authentication application 110 can determine that the executable file and a subset of the files 190 associated with the executable file are accessible files. In one embodiment, the authentication application 110 can additionally execute the accessible files.

In other embodiments, the authentication application 110 can further configure a digital display device to render a user interface for accessing the accessible files. The digital display device can be coupled to the machine 100 and be configured to display or project a user interlace. The user interface is a rendered output of the digital display device which a user can view and interact with. Additionally, the user interface can include and/or display one or more of the accessible files and/or control options for accessing one or more of the accessible files.

Figure 2:
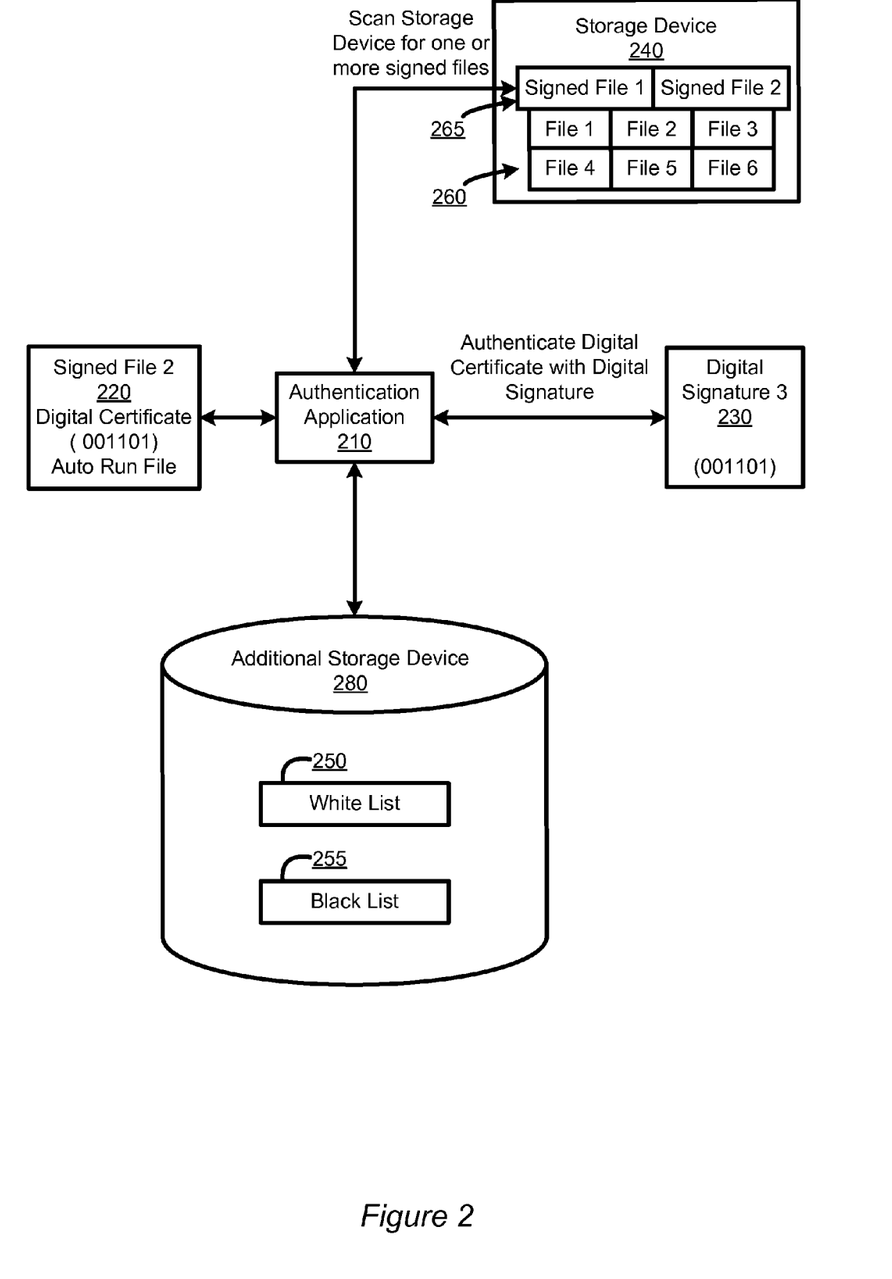
FIG. 2 illustrates a block diagram of an authentication application authenticating one or more signed files from a storage device according to an embodiment of the invention.

FIG. 2 illustrates a block diagram of an authentication application 210 authenticating one or more signed files 265 from a storage device 240 according to an embodiment of the invention. As noted above, in response to the storage device 240 coupling to a machine, the authentication application 210 can scan the storage device 240 using a processor for one or more signed files 265.

As illustrated in FIG. 2, when the storage device 240 couples to a machine, the authentication application 210 scans files 260 on the storage device 240 using the processor for one or more signed files 265. As noted above, after detecting one or more signed files 265, the authentication application 210 will proceed to authenticate one or more of the signed files 265.

In one embodiment, as illustrated in FIG. 2, authenticating one or more of the signed files 265 includes authenticating a corresponding digital certificate of one or more of the signed files 265 with one or more digital signatures. As noted above, a digital certificate can be an attachment of a signed file. In other embodiments, the authentication application 210 can authenticate one or more signed files 265 in response to a publisher of a corresponding digital certificate listed in a white list 250 or a black list 255.

As illustrated in FIG. 2, in one embodiment, the authentication application 210 initially attempts to authenticate signed file 2 220. In authenticating signed file 2 220, the authentication application 210 compares a digital key (001101), listed in the digital certificate of signed file 2 220, and compares the digital key (001101) to digital signature 3 230 (001101). As noted above and as illustrated in FIG. 2, in one embodiment, digital signature 3 230 can be stored as part of signed file 2 220. In other embodiments, a digital signature can be stored on additional devices coupled to the machine and/or accessible to the authentication application 210.

As shown in FIG. 2, the digital key (001101) of the digital certificate of signed file 2 220 matches digital signature 3 230 (001101). As a result, the authentication application 210 determines that signed file 2 220 has successfully been authenticated. In response to successfully authenticating signed file 2 220, the authentication application 210 can access the accessible files on the storage device 240.

As illustrated in FIG. 2, in one embodiment, signed file 2 220 is an auto run file. As a result, the authentication application 210 can determine that all of the files 240 on the storage device 240 are associated with the auto run file and all of the files 240 are determined to be accessible files.

Figure 3:
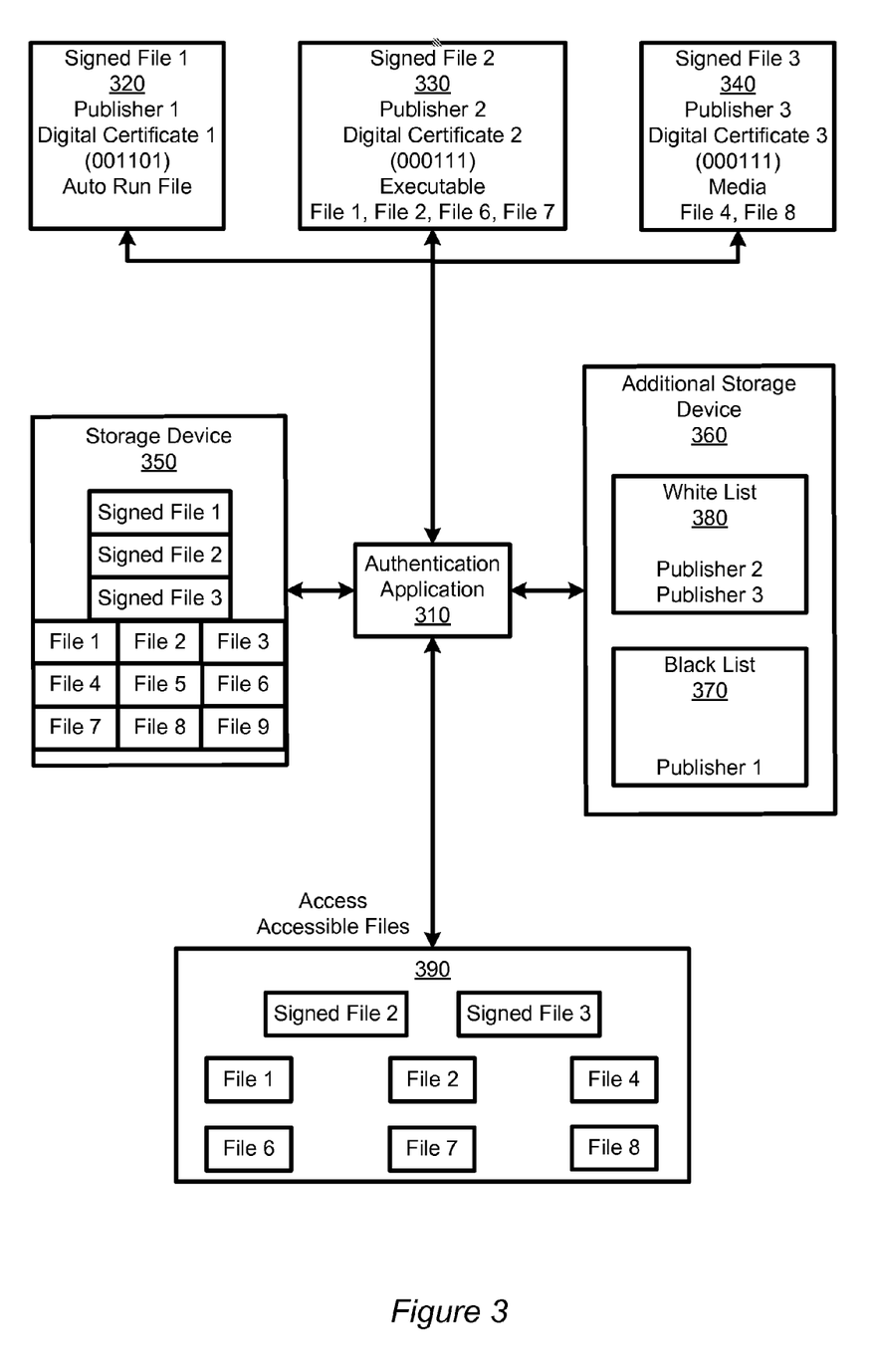
FIG. 3 illustrates an authentication application accessing accessible files from a storage device in response to authenticating one or more signed files according to an embodiment of the invention.

FIG. 3 illustrates an authentication application 310 accessing accessible files from a storage device 350 in response to authenticating one or more signed files 320, 330, 340, according to an embodiment of the invention. As noted above and as illustrated in FIG. 3, a processor and/or the authentication application 310 can scan the storage device 350 for one or more signed files and proceed to authenticate one or more of the signed files 320, 330, 340 in response to the storage device 350 coupling to a machine.

In one embodiment, as noted above, one or more of the signed files 320, 330, 340 can be authenticated in response to a publisher of a corresponding digital certificate. As illustrated in FIG. 3, the authentication application 310 can initially access one or more of the signed files 320, 330, 340 from the storage device 350 and proceed to identify a publisher of the corresponding digital certificates. As shown in FIG. 3, the authentication application 310 identifies that Publisher 1 corresponds to Digital Certificate 1 of Signed File 1 320, Publisher 2 corresponds to Digital Certificate 2 of Signed File 2 330, and Publisher 3 corresponds to Digital Certificate 3 of Signed File 3 340.

As noted above, when authenticating a corresponding digital certificate in response to a publisher, the authentication application 310 can access and scan a white list 380 or a black list 370 for a publisher of a digital certificate. As illustrated in FIG. 3, in one embodiment, the white list 380 and the black list 370 are stored on an additional memory storage device 360. In other embodiments, the white list 380 and/or the black list 370 can be stored on additional locations and can be accessible to the authentication application 310 through a network interface.

Additionally, as illustrated in FIG. 3, the authentication application 310 accesses and scans the white list 370 and finds that Publisher 2 and Publisher 3 are listed as approved publishers. As a result, the authentication application 310 determines that Digital Certificate 2 and Digital Certificate 3 are authenticate and successfully authenticates Signed file 2 330 and Signed file 340.

Further, the authentication application 310 scans the black list 370 and determines that Publisher 1 is listed as an unapproved publisher. As a result, Signed File 1 320 has failed authentication since the authentication application 310 determines that Digital Certificate 1 was not successfully authenticated.

As noted above, in response to authenticating one or more of the signed files 320, 330, 340, the authentication application 310 can proceed to configure the processor to access the accessible files 390 from the storage device 350. Additionally, as noted above, the accessible files 390 include the successfully authenticated signed files and files associated with the successfully authenticated signed files.

As a result, as illustrated in FIG. 3, the authentication application 310 determines that signed file 2, signed file 3, file 1, file 2, file 4, file 6, file 7, and file 8 are accessible files 390 and proceeds to access them. Additionally, as illustrated in FIG. 3, signed file 2 330 is an executable file. In one embodiment, the authentication application 310 can additionally execute signed file 2 330 and the files associated with signed file 2 (file 1, file 2, file 6, and file 7).

Figure 4:
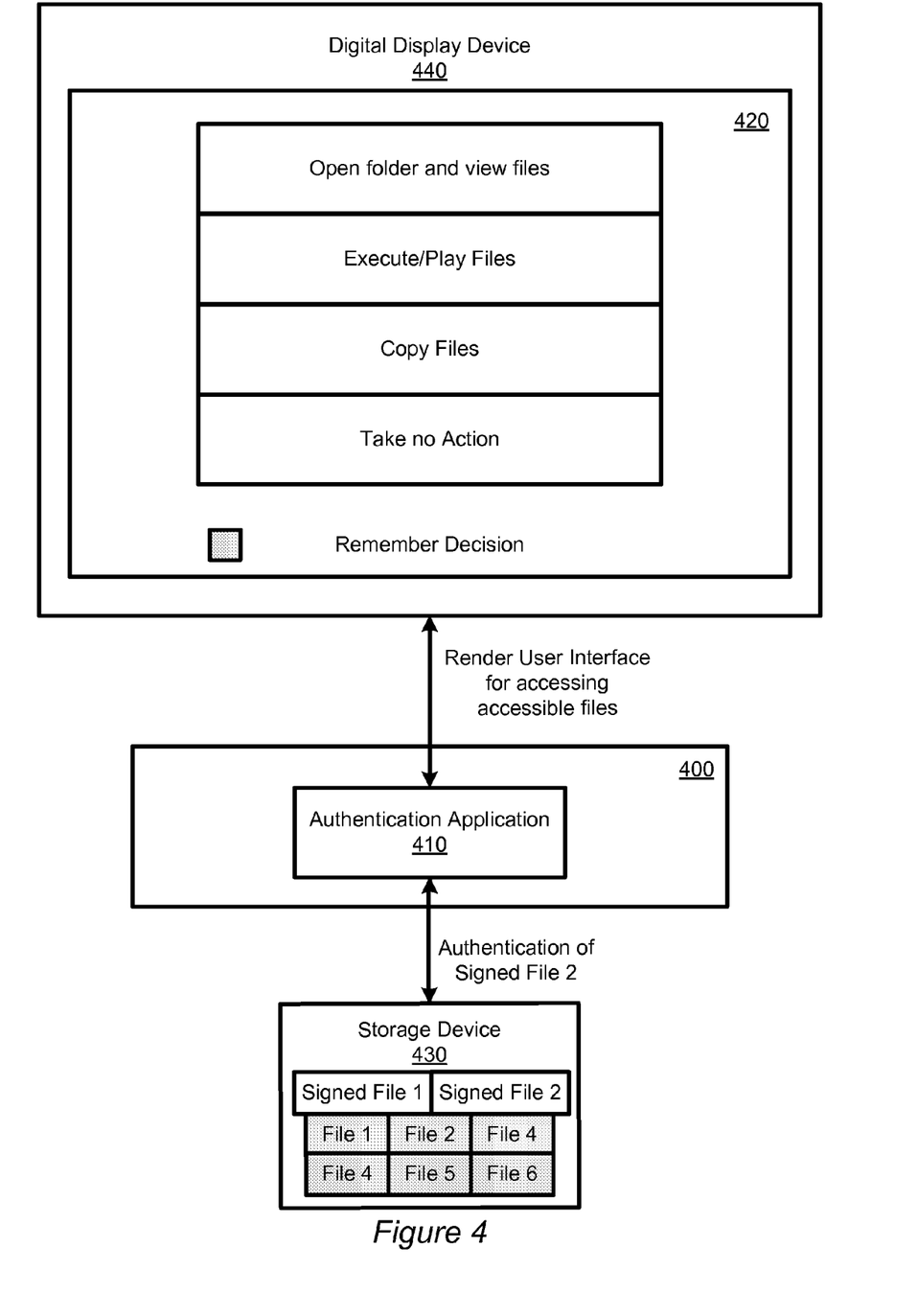
FIG. 4 illustrates a block diagram of an authentication application configuring a digital display device to render a user interlace in response to authenticating a signed file according to an embodiment of the invention.

FIG. 4 illustrates a block diagram of an authentication application 410 configuring a digital display device 440 to render a user interface 420 in response to authenticating a signed file according to an embodiment of the invention. As noted above and as illustrated in FIG. 4, in one embodiment, the authentication application 410 is included in a machine 400. Additionally, as noted above, in one embodiment, a digital display device 440 can be coupled to the machine 400 and can be configured by the authentication application 410 to render a user interface 420 for accessing accessible files.

As shown in FIG. 4, the authentication application 410 renders the user interface 420 in response to successfully authenticating signed file 2 from a storage device 430. Additionally, as noted above, the user interface 420 can display one or more of the accessible files and/or control options for accessing one or more of the accessible files. As shown in FIG. 4, in one embodiment, the control options can include control options to open a folder and view the accessible files, to execute/play the accessible files, to copy the accessible files, or to not perform any actions on the accessible files.

Additionally, as shown in the present embodiment, the user interface can include an option for the authentication application 410 to remember which choice was made. By remembering which choice was made, the authentication application 410 can automatically select the same control option again for the accessible files when the storage device 430 re-couples to the machine 400.

Figure 5:
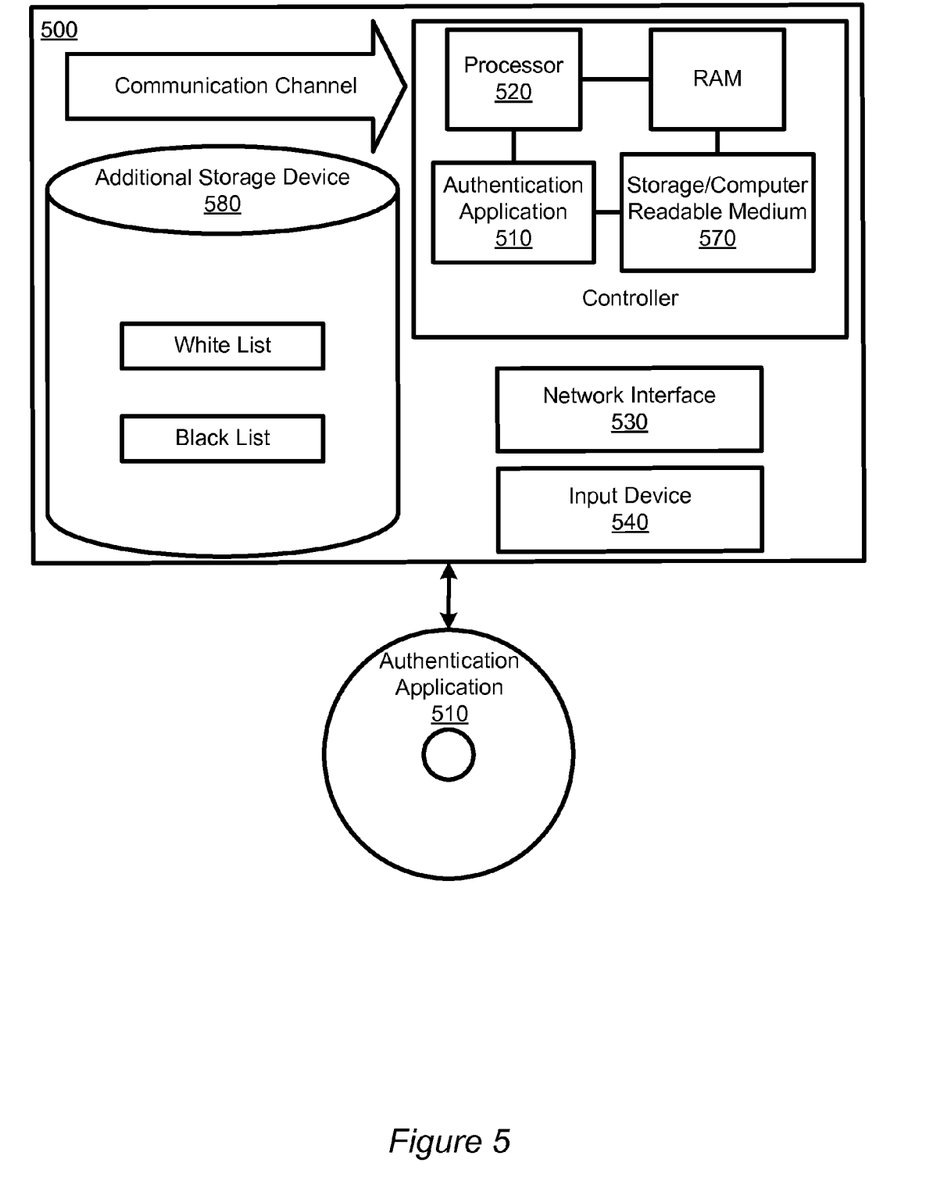
FIG. 5 illustrates a machine with an embedded authentication application and an authentication application stored on a removable medium being accessed by the machine according to an embodiment of the invention.

FIG. 5 illustrates a machine 500 with an embedded authentication application 510 and an authentication application 510 stored on a removable medium being accessed by the machine 500 according to an embodiment of the invention. For the purposes of this description, a removable medium is any tangible apparatus that contains, stores, communicates, or transports the application for use by or in connection with the machine 500. As noted above, in one embodiment, the authentication application 510 is firmware that is embedded into one or more components of the machine 500 as ROM. In other embodiments, the authentication application 510 is a software application which is stored and accessed from a hard drive, a compact disc, a flash disk, a network drive or any other form of computer readable medium that is coupled to the machine 500.

Figure 6:
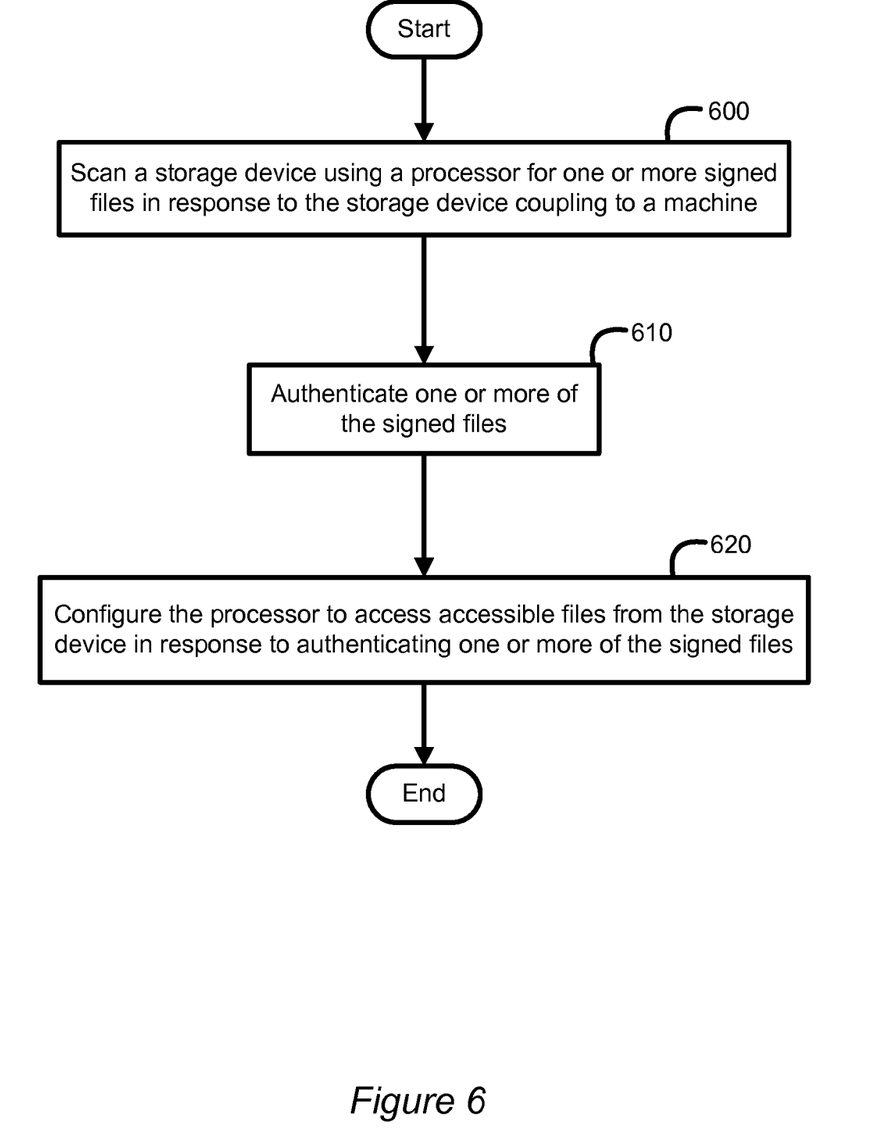
FIG. 6 is a flow chart illustrating a computer implemented method for accessing one or more files according to an embodiment of the invention.

FIG. 6 is a flow chart illustrating a computer implemented method for accessing one or more files according to an embodiment of the invention. The method of FIG. 6 uses a machine coupled to a storage device, one or more signed files, a processor, one or more digital signatures, a white list, a black list, and an authentication application. In other embodiments, the method of FIG. 6 uses additional components and/or devices in addition to and/or in lieu of those noted above and illustrated in FIGS. 1, 2, 3, 4, and 5.

As noted above, a processor and/or an authentication application initially scans one or more ports on the machine for a storage device coupling to the machine through a wireless or through a wired connection. Once the storage device is determined to be coupled to the machine, the authentication application will use the processor to scan the storage device for one or more signed files 600.

As noted above, in one embodiment, the authentication application runs as a background service on the machine. In another embodiment, the authentication application is launched by the processor in response to the storage device coupling to the machine.

If the authentication application finds any signed files on the storage device, the processor will proceed to configure to the authentication application to authenticate one or more of the signed files 610. As noted above, when authenticating one or more of the signed files, the authentication application authenticates a digital certificate of one or more of the signed files with one or more digital signatures and/or in response to a publisher of the digital certificate.

One or more digital signatures can be stored on corresponding signed files. In another embodiment, one or more of the digital signatures are stored on an additional storage device accessible to the authentication application.

Additionally, when authenticating one or more of the signed files in response a publisher of a corresponding digital certificate, the authentication application scans a white list and a black list. As noted above, the white list and/or the black list can be stored on the additional storage medium or on additional devices accessible to the authentication application. Additionally, the white list and/or the black list can be updated in response to the authentication application authenticating digital certificates with one or more digital signatures.

Once the authentication application has authenticated one or more of the signed files on the storage device, the processor can configure the authentication application to access accessible files from the storage device 620.

As noted above, if one or more of the signed files which have been successfully authenticated is an auto run file, the authentication application will determine that all of the files from the storage device are accessible files. In another embodiment, if one or more of the successfully authenticated signed files is an executable file, then the executable file and one or more of the files associated with the executable file are determined to be accessible files.

In other embodiments, the authentication application can additionally execute one or more of the accessible files and/or configure a digital display device to render a user interface for accessing and/or controlling one or more of the accessible files.

The method is then complete or the processor can continue to configure the authentication application to continue to scan for a storage devices coupling to the machine and proceed to configure the authentication application to access accessible files on the storage device in response to authenticating one or more signed files from the storage device. In other embodiments, the method of FIG. 6 includes additional steps in addition to and/or in lieu of those depicted in FIG. 6.

Figure 7:
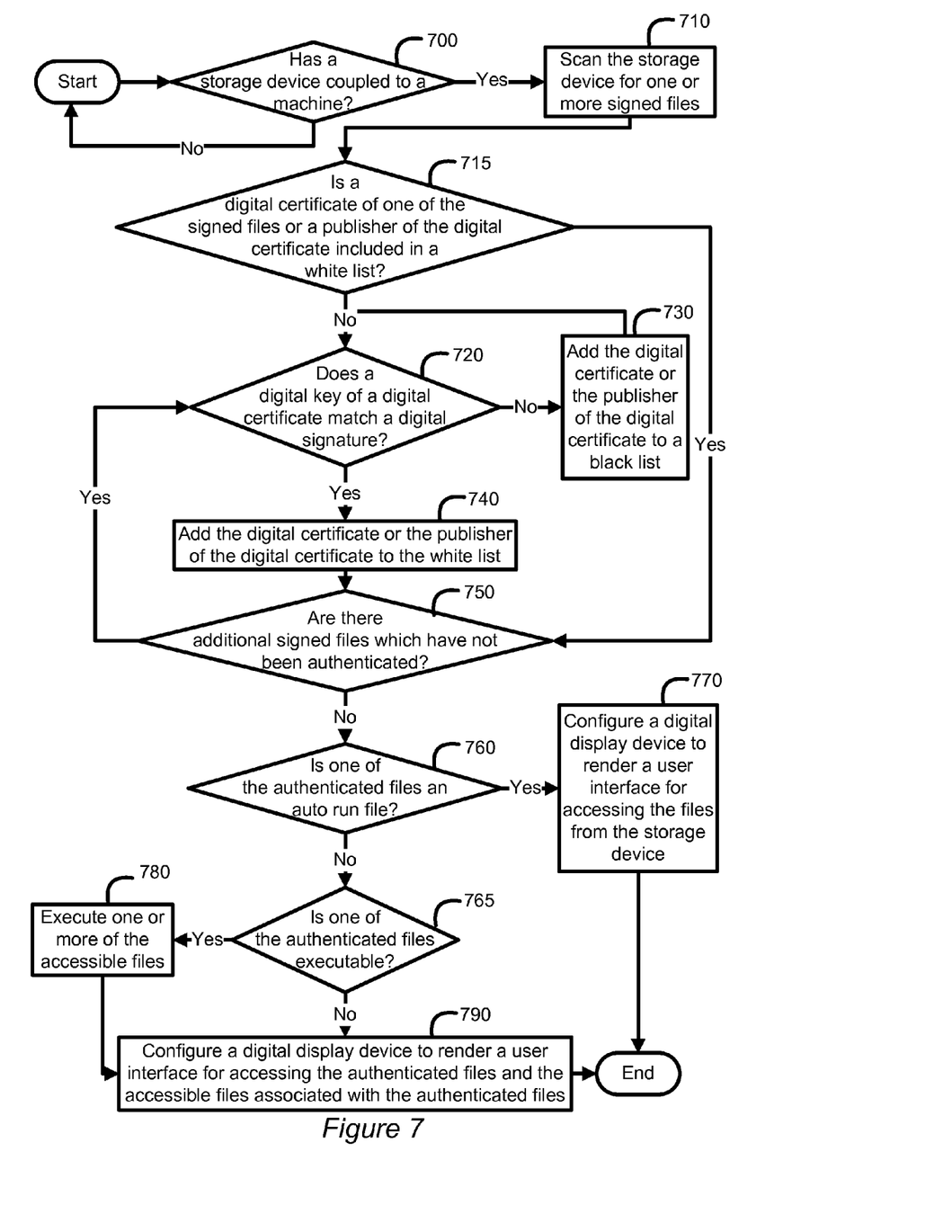
FIG. 7 is a flow chart illustrating a computer implemented method for accessing one or more files according to another embodiment of the invention.

FIG. 7 is a flow chart illustrating a computer implemented method for accessing one or more files according to another embodiment of the invention. Similar to the computer implemented method of FIG. 6, the computer implemented method of FIG. 7 uses a machine coupled to a storage device, one or more signed files, a processor, one or more digital signatures, a white list, a black list, and an authentication application. In other embodiments, the method of FIG. 7 uses additional components and/or devices in addition to and/or in lieu of those noted above and illustrated in FIGS. 1, 2, 3, 4, and 5.

As noted above, a processor and/or an authentication application initially scan one or more ports on the machine 10 determine whether a storage device has coupled to the machine through a wired or wireless connection 700.

If no storage device has coupled to the machine, the processor and/or the authentication application will continue to determine whether a storage device has coupled to the machine 700. If the storage device is determined to be coupled to the machine, then the authentication application will use the processor to scan the storage device for one or more signed files 710.

As noted above, a signed file is a file which has been signed with a digital certificate. Additionally, as noted above, the digital certificate can be an attachment to the signed file. In one embodiment, if the authentication application finds one or more signed files on the storage device, the authentication application can proceed to authenticate one or more of the signed files by determining whether a digital certificate or a publisher of the corresponding digital certificate is included in a white list 715.

As noted above, the white list can be a certificate store and includes a list of publishers and/or digital certificates of one or more signed files which have been determined by the authentication application to be authentic.

If the digital certificate or the publisher of the corresponding digital certificate is included in the white list, the authentication application will determine that the corresponding signed file was successfully authenticated and proceed to determine whether there are any additional signed files on the storage device which have not been authenticated 750.

If none of the digital certificates or none of the publishers of the digital certificates are included in the white list, the authentication application will proceed to determine whether a digital key of a digital certificate corresponding to one or more of the signed files matches a digital signature 720.

As noted above, the authentication application can compare a digital key of a corresponding digital certificate to one or more digital signatures and scan for a match. Additionally, the digital signatures can be stored on a corresponding signed file. In another embodiment, the digital signatures can be stored on the additional storage device. In other embodiments, the digital signatures can be stored on additional locations accessible to the authentication application.

In one embodiment, if a digital key of the digital certificate does not match any of the digital signatures, the authentication application will determine that authentication of the corresponding signed file has failed and proceed to add the corresponding digital certificate to a black list 730. As noted above, the black list is a list of digital certificates or publishers of the corresponding digital certificates which have failed authentication.

In one embodiment, before adding a digital certificate or a publisher of the digital certificate to the black list, the authentication application can configure a digital display device to render a message prompting a user to approve or disapprove the adding of the digital certificate to the black list.

Once the corresponding digital certificate has been added to the black list, the authentication application can continue to determine whether a digital key of a digital certificate corresponding to one or more of the signed files match a digital signature 720. If a digital key matches one of the digital signatures, the authentication application can proceed to add the corresponding digital certificate or the publisher of the corresponding digital certificate to the white list 740. Additionally, the authentication application will determine that the corresponding signed file has been successfully authenticated.

Similar to above, before adding a digital certificate or the publisher of the digital certificate to the white list, the authentication application can configure a digital display device to render a message prompting a user to approve or disapprove the adding of the digital certificate or the publisher of the digital certificate to the white list.

Once the corresponding digital certificate has been added to the white list, the authentication will proceed to determine whether there are any additional signed files on the storage device which have not been authenticated 750. If there are additional signed files which have not been authenticated, the authentication application will continue to determine whether a digital key of a digital certificate matches a digital signature 720 and proceed to add one or more corresponding digital certificates and/or publishers to a white list or a black list in response to authenticating the signed files.

Once all of the signed files have been authenticated, the authentication application will proceed to determine whether one or more of the authenticated files is an auto run file 760. In other embodiments, the authentication application can proceed to determine whether one or more of the authenticated files is an auto run file 760 before determining whether all of the signed files have been authenticated 750.

If one or more of the authenticated signed files is an auto run file, the authentication application will determine that all of the files on the storage device are accessible files. Additionally, the authentication application can configure a digital display device to render a user interface for accessing the accessible files on the storage device 770. As noted above, the digital display device can display and/or project the user interface.

In one embodiment, the user interface can additionally display one or more control options for accessing one or more of the accessible files. In other embodiments, the authentication application can additionally proceed to access the files on the storage device by viewing them, executing them, and/or associating them with corresponding applications on the machine.

If one or more of the authenticated signed files is not an auto run file, the authentication application will proceed to determine whether one or more of the authenticated signed files is an executable file 765. As noted above, in one embodiment, the executable file can be an installation file.

If one or more of the authenticated signed files is an executable file, the authentication application will determine that the authenticated signed file and files associated with the signed file are accessible files. Additionally, the authentication application can proceed to execute the executable the and one or more accessible ides associated with the executable file 780. Additionally, the authentication application can configure the digital display device to render a user interface for accessing the authenticated ides and the accessible files associated with the authenticated files 790.

In another embodiment, if one or more of the authenticated files is not an executable file, the authentication application can skip executing one or more of the files and proceed to configure the digital display device to render a user interface for accessing the authenticated files and the accessible files associated with the authenticated files 790.

The method is then complete or the authentication application can continue to scan for one or more storage devices coupling to the machine and proceed to configure the authentication application to access accessible files on the storage device in response to authenticating one or more signed files. In other embodiments, the method of FIG. 7 includes additional steps in addition to and/or in lieu of those depicted in FIG. 7.

By authentication one or more signed files on a storage device in response to the storage device coupling to a machine, a more secure environment for the machine can be created. Additionally, by accessing one or more accessible ides in response to authenticating one or more of the signed files, convenience can be gained and a more user friendly experience can be produced.

What is claimed is:

1. A computer implemented method comprising:
    scanning a storage device using a processor for one or more signed files in response to the storage device coupling to as machine;
    determining whether a digital certificate of the one or more signed files matches a white list stored in the machine;
    in response to a determination that the digital certificate of the one or more signed files does not match the white list stored in the machine, authenticating the one or more of the signed files;
    in response to authenticating, the one or more of the signed files, adding the digital certificate of the one or more of the sinned files to the white list; and
    configuring the processor to access accessible files from the storage device in response to authenticating one or more of the signed files.

2. The computer implemented method of claim 1 wherein the digital certificate uniquely identifies a publisher of the one or more of the signed files.

3. The computer implemented method of claim 1 wherein the accessible files include the files on the storage device when one of the signed files is authenticated and the signed file is an auto run file.

4. The computer implemented method of claim 1 wherein the accessible files include a subset of the files on the storage device when one of the signed files is authenticated and determined to be executable.

5. The computer implemented method for accessing one or more files of claim 3 further comprising executing one or more the accessible files when one of the signed files is executable.

6. A machine comprising:
    a processor:
    a storage medium including:
        a white list;
        a black list; and
        an authentication application, executable by the processor to:
            in response to a storage device coupling to the machine, determine whether a digital certificate of one or more signed files is included in the white list or the black list, the one or more signed files stored in the storage device;
            in response to a determination that the digital certificate of the one or more signed files is not included in the white list or the black list, authenticate the one or more signed files;
            add at least a portion of the digital certificate to the white list in response to authenticating the one or more of the signed files; and
            access accessible files from the storage device in response to the one or more of the signed files being authenticated.

7. The machine of claim 6 wherein the authentication application operates as a background service on the machine.

8. The machine of claim 6 wherein the authentication application is launched by the processor from the storage medium in response to the storage device coupling to the machine.

9. The machine of claim 6 further comprising a digital display device configured to render a user interface for accessing the accessible files, wherein the user interface includes at least one from the group consisting of one or more of the accessible files and control options for accessing one or more of the accessible files.

10. A computer-readable program in a non-transitory computer-readable medium comprising:
    an authentication application to:
        in response to a storage device coupling to a machine, scan the storage device for one or more signed files;
        determine whether a digital certificate of the one or more signed files is included in a white list stored in the machine;
        in response to a determination that the digital certificate of the one or more signed files is not included in the white list stored in the machine, authenticate one or more of the signed files;
        add the digital certificate of one or more of the signed files or a publisher of the digital certificate to a white list when the digital certificate is successfully authenticated; and
        configure the machine to access accessible files on the storage device in response to authenticating the one or more of the signed files.

11. The computer-readable program in the non-transitory computer-readable medium of claim 10 wherein the authentication application is additionally to add the digital certificate of one or more of the signed files or a publisher of the digital certificate to a black list when the digital certificate fails authentication.

12. The computer-readable program in the non-transitory computer-readable medium of claim 10 wherein the white list is a certificate store.

13. The computer-readable program in the non-transitory computer-readable medium of claim 10 wherein the authentication application is further to, prior to authenticating, the one or more of the signed files, determine Whether the digital certificate of the one or more signed files is included in a black list stored in the machine.

14. The computer-readable program in the non-transitory computer-readable medium of claim 10 wherein the authentication application is further to:
    access a plurality of digital signatures through a network connection; and
    compare the digital certificate of the one or more signed files to the plurality of digital signatures.

15. The computer implemented method of claim 1, further comprising, prior to authenticating the one or more of the signed files, determining that the digital certificate of the one or more signed files is not included in a black list stored in the machine.

16. The computer implemented method of claim 1, wherein authenticating the one or more of the signed files comprises:
- accessing, by the machine, one or more digital signatures through a network connection; and
- comparing the digital certificate of the one or more signed files to the one or more digital signatures.

17. The machine of claim 6, wherein the authentication application is further to:
- access a plurality of digital signatures through a network connection; and
- compare the digital certificate of the one or more signed files to the plurality of digital signatures.

* * * * *

UNITED STATES PATENT AND TRADEMARK OFFICE
CERTIFICATE OF CORRECTION

PATENT NO. : 9,608,984 B2 Page 1 of 1
APPLICATION NO. : 13/384764
DATED : March 28, 2017
INVENTOR(S) : Keith Rogers et al.

It is certified that error appears in the above-identified patent and that said Letters Patent is hereby corrected as shown below:

In the Claims

In Column 11, Line 23, in Claim 1, delete "as" and insert -- a --, therefor.

In Column 11, Line 31, in Claim 1, delete "authenticating," and insert -- authenticating --, therefor.

In Column 11, Line 53, in Claim 6, delete "processor:" and insert -- processor; --, therefor.

In Column 12, Line 52, in Claim 13, delete "authenticating," and insert -- authenticating --, therefor.

In Column 12, Line 53, in Claim 13, delete "Whether" and insert -- whether --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*